July 17, 1962 L. LACZKO 3,045,183

SIGNAL RATE OF CHANGE DETECTOR AND INDICATOR

Filed April 27, 1959 2 Sheets-Sheet 1

INVENTOR
LASZLO LACZKO

BY
Harry T. Berriman
ATTORNEY

United States Patent Office 3,045,183

Patented July 17, 1962

3,045,183
SIGNAL RATE OF CHANGE DETECTOR AND INDICATOR

Laszlo Laczko, Poughkeepsie, N.Y., assignor to International Business Machines Corporation, New York, N.Y., a corporation of New York Filed Apr. 27, 1959, Ser. No. 809,152
2 Claims. (Cl. 324—118)

This invention relates to signal monitoring and indicating devices and more particularly to a device for monitoring the rate at which a signal is changing in time and for generating an indication when the rate of change of the signal exceeds a predetermined specified rate. The device is sensitive only to the rate of change of the monitored signal and is independent of the absolute magnitude of the signal.

To effect the desired rate of change monitoring and indicating analysis for an input signal, the signal is applied to an input condenser-resistor network having an output that is applied to a vibrator type signal chopper. The signal chopper functions to convert a D.C. potential level to an A.C. signal to permit A.C. amplification in a conventional A.C. amplifier. The input condenser-resistor network has a time constant such that with an applied input signal which is not changing in excess of a predetermined rate, a particular maximum level of signal is available from the network for application to the chopper. This maximum level signal is applied to the chopper input A.C. amplifier, amplified therein and finally appears at a push-pull output of the amplifier. The A.C. amplifier may have a conventional negative feedback signal path. The amplifier push-pull output drives a full wave rectifier, the output of which is used to control the bias of a relay control tube. The rate detector provides a contact closure of a control relay when the input signal is changing at a rate equal to or less than the specified rate. If the input signal exceeds the predetermined rate of change, the output of the rectifier correspondingly increases to overcome the normal control tube bias in a manner to cut off the control tube and deenergize the control relay to open a contact. The sensitivity of the device can be controlled to be responsive at different levels of desired maximum rates of change of a monitored signal by a potentiometer adjustment (changes time constant) in the input resistor-condenser network and/or by varying the gain of the A.C. amplifier. As previously mentioned, the device is sensitive only to the rate of change of the input signal and independent of the absolute magnitude of the signal.

It is accordingly an object of the invention to provide apparatus for monitoring an input signal and providing an indication when the input signal is changing in excess of a specified rate.

It is another object to provide apparatus for monitoring the rate of change of a signal and indicating an exceeding of a predetermined rate of change by the signal.

It is another object of the invention to provide a signal rate of change detector and indicator wherein the device is sensitive only to rate of change of a monitored signal and is independent of the absolute magnitude of the monitored signal.

It is another object of the invention to provide apparatus for detecting and indicating the rate of change of a signal.

The foregoing and other objects, features and advantages of the invention will be apparent from the following more particular description of preferred embodiments of the invention, as illustrated in the accompanying drawings.

Figure 1:
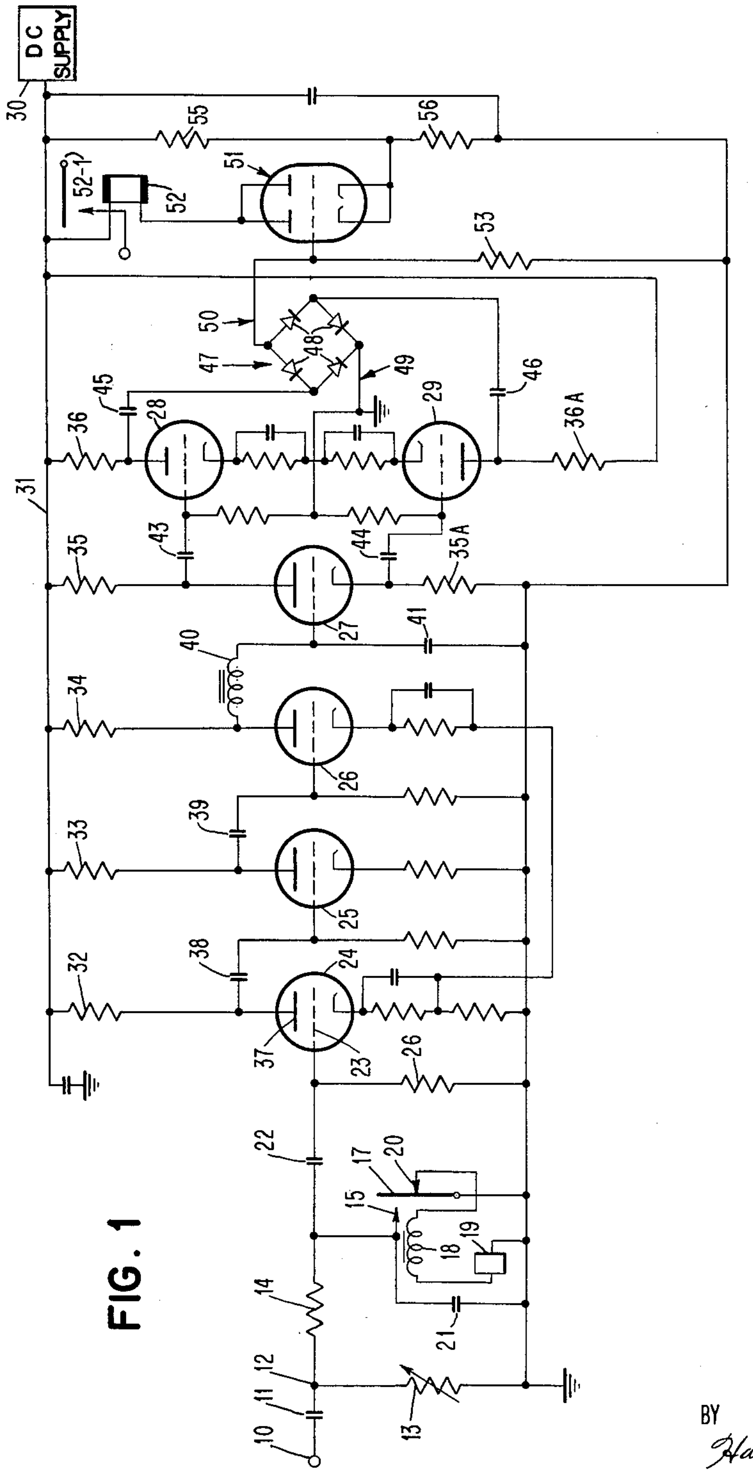
FIG. 1 is a circuit diagram of the signal rate of change detector and indicating apparatus.

Referring now to FIG. 1, the signal to be monitored for rate of change is applied to an in put terminal 10 (left side of FIG. 1) of the rate detector and indicator. The input terminal 10 is connected through a capacitor 11 to a junction 12. The junction 12 is, in turn, connected through a potentiometer 13 to ground, and also through a resistor 14 to one contact 15 of a conventional vibrator or chopper, a cooperating conductive reed 17 of the vibrator being connected directly to ground as indicated.

The vibrator or chopper which is shown in simplified diagrammatic form may include a motor coil 18 having one terminal connected to the terminal of a suitable power source 19; the other terminal of the power source is grounded. The other terminal of the motor coil is connected to a contact 20 shown as engaging the conductive reed. With the vibrator in the position shown, the motor coil 18 is energized to attract the reed 17 away from the contact 20 and into position to engage the contact 15. However, as soon as the reed 17 is pulled away from the contact 20, the circuit through the motor coil 18 is broken and the reed is, therefore, vibrated back and forth between the contact 15 at one end of its stroke and the contact 20 at the other end of its stroke. This conventional vibrator action is well known in the art. By this action it will be appreciated that any potential at contact 15 is shunted to ground periodically at a rate dependent upon the frequency of operation of the vibrator. It will be noted that a capacitor 21 is connected from contact 15 to ground and serves to shunt the parasitic noises coming from contacts 15.

The junction of the contact 15 and the resistor 14 is connected through a coupling capacitor 22 to the grid 23 of the first vacuum tube 24 of a conventional A.C. amplifier. An input resistor 26 extends between the grid of tube 24 and ground. The amplifier includes in addition to previously mentioned vacuum tube 24 (and associated circuit elements), vacuum tubes 25, 26, 27, 28 and 29 and associated required circuit elements. A positive voltage terminal of a D.C. power supply 30 is connected through a conductor 31 and related plate resistors 32, 33, 34, and 35, 36 and 36A, to the plate electrode of each of the tubes 24, 25, 26, 27, 28 and 29, respectively, in the usual manner. The input vacuum tube 24 is arranged in the usual triode amplifier configuration and with a signal applied to the grid electrode 23, the resulting amplified signal output generated on the associated plate terminal 37 is coupled through a capacitor 38 to the grid electrode of the tube 25 to drive the latter. Tube 25 is also connected in a conventional triode amplifier configuration and the resulting further amplified signal generated at the plate terminal of tube 26 is similarly applied through a capacitor 39 to the grid electrode of the tube 26 to drive the latter. This tube 27 is also connected as a triode amplifier so that a still further amplified signal results on the plate terminal of tube 26.

The output of tube 26 is coupled through an inductor 40 to grid of the tube 27 to drive it. The inductor 40 and an associated capacitor 41 connected to ground as shown, comprise a low pass filter for eliminating chopper noise etc. The vacuum tube 27 is connected in a conventional phase inverter paraphase amplifier circuit configuration wherein as a result of the driving input signal applied to the grid, output signals of equal magnitude but opposite phase or sense are generated on the associated plate and cathode terminals respectively. Thus with plate resistor 35 and an associated cathode resistor 35A being of equal magnitude to give equal magnitude output signals, the signal generated on the cathode terminal is in phase with the grid driving signal, while the signal generated on the plate terminal is 180° out of phase with the grid driving signal. This action is, of course, well known.

This paraphase output of tube 27 is utilized in the conventional manner to drive the respective grids of vacuum tubes 28 and 29 which are arranged in the conventional push-pull amplifier configuration. Thus the plate output of phase inverter 27 is applied through a capacitor 43 to the grid of tube 28, while the cathode output of phase inverter 27 is applied through a capacitor 44 to the grid of tube 29. The resulting plate output of tube 28 is applied through a capacitor 45 to the one input of a full wave diode rectifier generally indicated 47, while the plate output of tube 29 is applied through a capacitor 46 to the other input of the rectifier 47.

The rectifier 47 comprises 4 diodes 48 arranged in the conventional full wave rectifier circuit configuration and it is not believed necessary to review such action. The positive output terminal of the rectifier 47 is connected through a conductor 49 to ground as indicated, while the negative output terminal is connected through a conductor 50 to the grid of a vacuum tube 51.

The tube 51 is a dual-triode, the individual respective elements of which are paralleled as indicated. The parallel plates of the tube 51 are connected through a control winding of a relay 52 to the positive line 31 from the D.C. supply 30. The paralleled grids of the tube 51 are connected through an input resistor 53 to ground, while the commoned cathodes are connected to a resistor divider network comprised of resistors 55 and 56 extending between the supply line 31 and ground. Under normal conditions wherein the monitored input signal applied to input terminal 10 is not changing in excess of a predetermined rate (for example 15 millivolts per second), the grid of tube 51 is maintained at a negative potential (through resistor 53) relative to the cathode potential of tube 51 insufficient to cut the tube off. Consequently with tube 51 conducting, the relay 52 is energized and the associated contacts 52–1 are closed to complete a circuit therethrough to any type of utilization or indicating device as desired.

Figure 2:
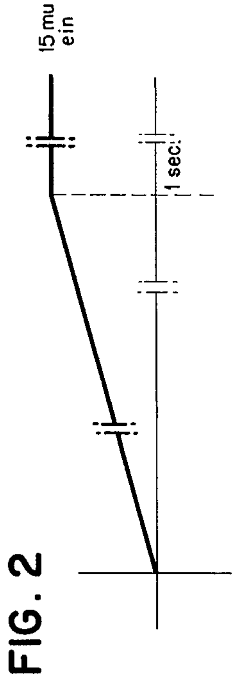
FIG. 2 is a diagram of a representative input signal which is in the form of a ramp function and is initially changing at a particular rate.
Figure 3:
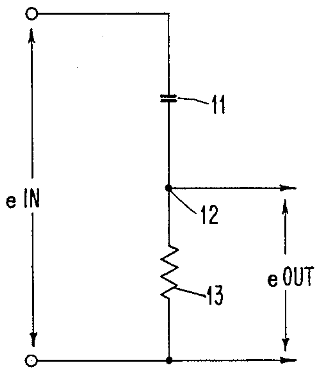
FIG. 3 is a circuit diagram of the input network of the signal rate of change and indicating apparatus.
Figure 4:
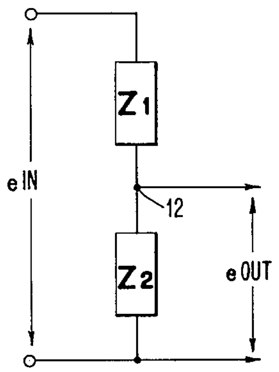
FIG. 4 is an impedance diagram of the circuit of FIG. 3.
Figure 5:
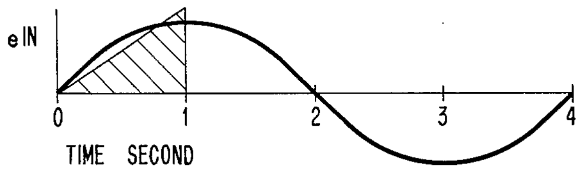
FIG. 5 is a waveform diagram of the input waveform of FIG. 2 superimposed on a sine wave that may be considered the equivalent therefor for purposes of mathematical analysis.

Returning now to the capacitor-resistor input network connected to input terminal 10, assume that an input signal as shown in FIG. 2 is applied to this terminal 10. This signal is indicated as rising at a rate of 15 millivolts per second in a straight line ramp function and reaches a steady state form at the end of 1 second. Let us examine the effect of the applied ramp input signal. The input circuit is as shown in FIG. 3. Substituting two reactances $Z_1$ and $Z_2$ for capacitor 11 and resistor 13, the input circuit can be drawn as shown in FIG. 4. The values of these reactances $Z_1$ and $Z_2$ is as follows:

$$Z_1=\frac{1}{2\pi f_r C}$$

$$Z_2=\text{resistor } 13$$

neglecting the phase difference, as this does not effect the phenomena being discussed. Furthermore, the ramp input signal rate of change may be considered as a portion of a sinusoidal waveform as indicated in FIG. 5, the shaded area representing the ramp signal shown in FIG. 2. From the above it follows that $$\frac{E_{in}}{E_{out}}=\frac{Z_1+Z_2}{Z_2}$$

Solving for $E_{out}$ $$E_{out}=E_{in}\times\frac{Z_2}{Z_1+Z_2}$$

From this last equation it is seen that the output voltage $E_{out}$ depends on $Z_1$ which is the frequency depending reactance or $$Z_1=\frac{1}{2\pi f_r C}$$

If the input is pure D.C., the frequency is zero and $Z_1$ becomes infinite. With $Z_1$ infinite, $E_{out}$ becomes zero regardless of the magnitude of the incoming D.C. With increasing frequency or increasing rate of change of the input signal, $Z_1$ becomes some realizable value (less than infinite) and $E_{out}$ assumes some corresponding magnitude.

Representative values for the input network may be as follows:

Capacitor 11=0.1 microfarad
Resistor 13=1 megohm
Resistor 14=1 megohm With an input signal changing at a rate of 15 millivolts per second as indicated in FIG. 2, this may be considered as the first ¼ cycle of a sine wave of a 4 second period as indicated in FIG. 5 so the frequency $f_r$=.25 cycle per second $$E_{in}=.015\text{ volt}$$

$$Z_1=\frac{1}{2\pi f_r C}=\frac{1}{6.28\times .25\times 10^{-7}}=6.4\text{ megohms}$$

$$Z_2=1\text{ megohm}$$

$$E_{out}=E_{in}\frac{Z_2}{Z_1+Z_2}=.015\times\frac{10^6}{6.4\times 10^6+10^6}=.0023\text{ volt}$$

The output voltage $E_{out}$ is applied through the resistor 14 to the contacts 15 of the vibrator. The purpose of the vibrator or chopper in the signal path from junction 12 to the grid of the first tube 23 of the A.C. amplifier, is to translate $E_{out}$ into a square wave in order to provide a suitable A.C. drive for the amplifier. Each time the contact 15 is closed by the vibrator action as explained, the potential of the contact side of resistor 14 drops to ground potential and also of course provides an additional charge or discharge path through resistor 14 for the capacitor 11. Thus, it is evident that the actual magnitude which the waveform of FIG. 2 reaches at any particular point is dependent on the rate of change of the input signal and not on the absolute magnitude of the applied signal.

For every particular rate of change of the input signal there is some particular level of potential generated at junction 12. The input network may be considered as being in the form of a 3 armed network having a capacitor 11 in the input arm, a resistor 13 in a second arm, and a resistor 14 in an output arm, the three arms being joined at the junction 12. Although the input arm is indicated as containing a capacitor, it will be appreciated that an alternate A.C. impedance device or indicator would give comparable action.

With $E_{input}$ not exceeding a predetermined representative 15 millivolt per second rate of change, for example, as indicated in FIG. 2, the magnitude of the resulting square wave input applied to the first amplifier stage 24 is such that the resulting signal output from the final amplifier stages and which is subsequently rectified and applied through conductor 50 to the grid of tube 51 is insufficient, in conjunction with the normal bias level as applied through resistor 53, to render tube 51 nonconductive. Thus the contact 52–1 in remaining closed indicates that the input signal is not changing at a rate exceeding a desired maximum rate.

Assuming now a rate of change of the input signal in excess of the maximum specified rate, the resulting signal level from the input capacitor-resistor network and as subsequently chopped into a square wave, will cause a rectified amplifier output of a level sufficient to cut-off the tube 51. With tube 51 cut-off, the relay 52 is deenergized, the deenergization of the relay 52 causing its contact 52–1 to open, thus indicating, to an associated device, the fact that the input signal changed at a rate in excess of the specified rate.

While the input wave shown in FIG. 2 is a ramp function increasing at a constant rate during the first second thereof, it will be appreciated that this is only a representative waveform and the device is equally responsive to an exponential or a more complex transient. The direction of the rate of change of the input signal is of no consequence by reason of the chopper action and the device is equally responsive to negative rate of changes of the input signal, as well as the positive rate of change action described. The particular rate of change chosen to effect a deenergization of the relay 52 can be varied of course, either by changing the normal bias level of tube 51 (manipulate the value of resistor 56) or by an adjustment of the potentiometer 13 to change the input network R-C-time constant. The apparatus described accordingly measures or detects the rate of change of a signal and indicates whether the rate of change exceeds or does not exceed a predetermined maximum.

In the particular rate of change detector and indicating arrangement shown in FIG. 1 and described above, the rectified output on conductor 50 is always negative although its actual magnitude does vary as explained, depending upon the rate of change of the input signal. The direction of the rate of change of the input signal whether positive or negative relative to ground does not affect this output from the rectifier with the connections as shown.

If it is required to detect not only the rate of change of the input signal, but also differentiate between negative (below ground) and positive (above ground) rate of changes, a synchronous rectifier arrangement may be utilized in conjunction with the same input network circuitry described above. The synchronous rectifier may be of any type.

Figure 6:
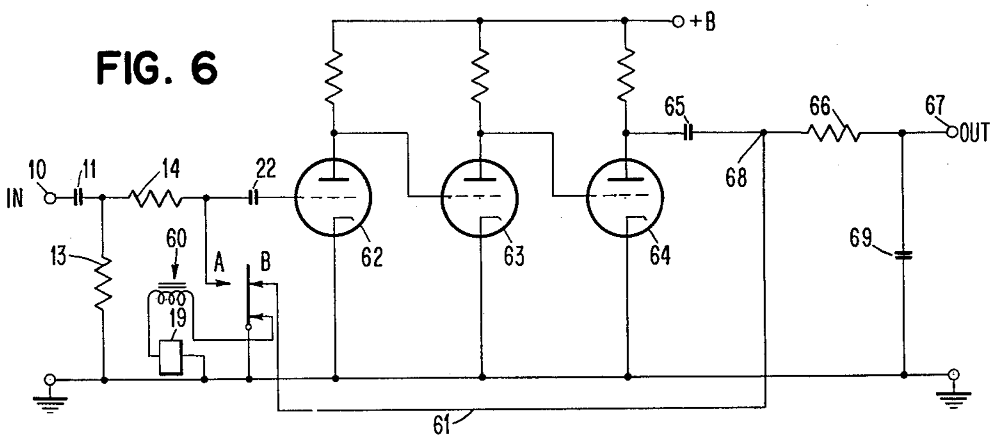
FIG. 6 is a circuit diagram of an alternate version of the signal rate of change detector and indicating apparatus.

Referring now to FIG. 6, a simplified version of one type of such a circuit is shown. In FIG. 6, the same input network of capacitor 11, and resistors 13 and 14 is provided as before. As before the output from resistor 14 is applied to a vibrator device 60 and through a capacitor 22 to the grid of a first of a series of triode amplifiers. It will be noted however that the vibrator contact is a single pole double throw type wherein in a first position (A) resistor 14 is connected to ground, while in a second position (B) a conductor 61 is connected to ground. There are provided an odd number of stages (tubes) 62, 63 and 64 in the amplifier so that the output from the last tube 64 is inverted from the sense of signal applied to the grid of the first tube. The output of the last tube 64 is applied through a capacitor 65 and resistor 66 to an output terminal 67. The previously mentioned conductor 61 is connected from the B contact side of vibrator 60 to the junction of capacitor 65 and condenser 66.

Consider first the case wherein a varying positive (above ground) input signal is applied to terminal 10. As before, a resultant positive signal is generated at resistor 14 and by the action of the A contact side of vibrator 60 is chopped into a positive square wave and applied to the grid of the first tube 62 of the amplifier. At the instant the switch of the vibrator transfers from the A to the B contact side, the following action transpires. With the A contact side open, the input to tube 62 swings from ground toward the positive signal output level from resistor 14. By reason of the odd number (3) of stages of amplification, there is effected by the signal applied to tube 62, a corresponding negative shift of the output tube 64. At this instant, however, the B contact side of vibrator 60 is closed and through conductor 61 prevents the potential of the junction 68 from going below ground. Thus the B contact side of the vibrator 60 eliminates the negative halves of the output square waveform from tube 64 or rectifies the output to only a positive output in the case of a positive input signal. The resistor 66 and a capacitor 69 connected as shown filter the positive square wave output to a positive D.C. output signal, the magnitude of which is proportional to the rate of change of the original input signal, while the positive sense of the output indicates that the rate of change was positive.

Consider now the case wherein the input signal is a varying negative (below ground) signal. The resultant negative signal (below ground) effects a corresponding negative signal level on the output of resistor 14, this output being chopped into negative square wave and applied to the grid of the first tube 62 of the amplifier. At the instant the switch of the vibrator transfers from the A to the B contact side, the following action transpires. With the A contact side open, the input to tube 62 swings from ground towards the negative signal output level from resistor 14. By reason of the odd number (3) stages of amplification, there is effected by the signal applied to the grid of tube 62, a corresponding positive shift of the output from tube 63. At this instant, however, the B contact side of vibrator 60 is closed and through conductor 61 prevents the potential of the junction 68 from going above ground. Thus, the B contact side of the vibrator 60 eliminates the positive halves of the output square waveform from tube 64 or rectifies the output to only a negative output in the case of a negative signal. Resistor 66 and capacitor 69 filter the negative square wave output to a negative D.C. output signal, the magnitude of which is proportional to the rate of change of the original input signal, while the negative sense of the output indicates that the input signal was negative so that the rate of change is negative.

The rectified and filtered signal output generated at terminal 67 may be connected to any suitable type of meter having a center scale 0 position, with positive indications to one side of center and negative indications to the other side. The meter reading will accordingly indicate not only the magnitude of the rate of change of the input signal applied to terminal 10, but also dependent upon which side of center scale the reading registers, indicates that the input signal rate of change was either positive or negative with respect to ground potential, as the case may be.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A D.C. signal rate of change analyzer comprising, in combination, a signal source generating a D.C. signal which may vary in time, an R-C-analyzer network comprised of an input capacitor connected from said signal source to a junction, a first resistor having one end connected to said junction and the other end to ground, a second resistor also having one end connected to said junction, said network translating any rate of change of said D.C. source signal into a corresponding voltage potential at the non-junction end of said second resistor, circuit means connecting said non-junction end of said second resistor to the input of a plural stage A.C. amplifier, said amplifier having an output terminal, a switch having one contact connected to ground and a companion contact connected to said second resistor non-junction end, means for periodically opening and closing said switch wherein a rectangular A.C. waveform is generated and applied to said amplifier input, a rectifier driven by the A.C. output on said amplifier output terminal and generating a corresponding rectified D.C. output, and means responsive to the magnitude of the rectifier output for manifesting the rate of change of said source signal.

2. A signal rate of change analyzer comprising, in combination, a signal source generating a variable signal of either positive or negative polarity comprising in combination, a three armed network having a capacitor in a first arm, a resistor in a second arm and a resistor in a third arm, said signal source being connected to said capacitor, with said second arm being grounded, an A.C. amplifier having an input and an output, an impedance circuit connecting said third arm to said A.C. amplifier input, signal chopper means also linked to said third arm and operable to periodically connect said third arm to ground wherein any D.C. potential level existing on said arm is translated into an A.C. waveform for driving said amplifier, synchronous rectifier means connected to said amplifier output for rectifying the A.C. signal output therefrom into a D.C. output of a positive polarity D.C. signal level if said signal input was positive, and a negative polarity D.C. signal level if said original input was negative, the magnitude of said negative or positive D.C. signal level representing the rate of change of the original input signal, and indicating means responsive to both the polarity and magnitude of said rectified output to indicate both the polarity and the magnitude of said rectified output.

References Cited in the file of this patent

UNITED STATES PATENTS

| | | |
|---|---|---|
| 2,591,345 | Ellis | Apr. 1, 1952 |
| 2,645,755 | Garfield | July 14, 1953 |
| 2,744,969 | Peterson | May 8, 1956 |
| 2,796,583 | Marsh et al. | June 18, 1957 |
| 2,938,170 | Berry | May 24, 1960 |